United States Patent
Ramnani et al.

(10) Patent No.: US 9,900,665 B2
(45) Date of Patent: Feb. 20, 2018

(54) CAPTION RENDERING AUTOMATION TEST FRAMEWORK

(71) Applicant: Telefonaktiebolaget LM Ericsson (publ), Stockholm (SE)

(72) Inventors: Bhushan Ramnani, Sunnyvale, CA (US); Zheng Nie, Sunnyvale, CA (US); Xiaosong Zhu, San Jose, CA (US); Juan Flores, Santa Clara, CA (US); Aparna Varanasi, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 16 days.

(21) Appl. No.: 15/098,883

(22) Filed: Apr. 14, 2016

(65) Prior Publication Data
US 2016/0373829 A1    Dec. 22, 2016

Related U.S. Application Data

(60) Provisional application No. 62/180,545, filed on Jun. 16, 2015.

(51) Int. Cl.
| | | |
|---|---|---|
| H04N 17/00 | (2006.01) |
| H04N 21/488 | (2011.01) |
| H04N 17/04 | (2006.01) |
| H04N 21/442 | (2011.01) |
| G06K 9/62 | (2006.01) |
| H04N 5/445 | (2011.01) |

(52) U.S. Cl.
CPC ....... *H04N 21/4884* (2013.01); *G06K 9/6202* (2013.01); *H04N 5/44504* (2013.01); *H04N 17/004* (2013.01); *H04N 17/04* (2013.01); *H04N 21/4424* (2013.01); *H04N 2017/008* (2013.01)

(58) Field of Classification Search
None
See application file for complete search history.

(56) References Cited

U.S. PATENT DOCUMENTS

| | | |
|---|---|---|
| 6,452,597 B1 | 9/2002 | Goldberg et al. |
| 6,628,833 B1 | 9/2003 | Horie |
| 6,795,076 B2 | 9/2004 | Deering et al. |
| 7,203,878 B2 | 4/2007 | Naegle et al. |
| 7,526,139 B2 | 4/2009 | Yamakado et al. |
| 8,792,054 B2 | 7/2014 | Mountain |

(Continued)

*Primary Examiner* — Michael Lee
*Assistant Examiner* — Humam Satti
(74) *Attorney, Agent, or Firm* — Nicholson De Vos Webster & Elliott LLP

(57) ABSTRACT

Exemplary methods for automatically testing closed caption (CC) rendering includes receiving a set of one or more reference audio video (AV) streams from an AV source, and generating reference CC images from the set of one or more reference AV streams starting from a recording start time to a recording stop time. In one embodiment, the method further includes receiving a set of one or more test AV streams from the AV source, and generating test CC images from the set of one or more test AV streams starting from the recording start time to the recording stop time. In one embodiment, the methods further include determining whether the AV source is performing CC rendering properly by automatically comparing the test CC images against the reference CC images.

30 Claims, 11 Drawing Sheets

(56) References Cited

U.S. PATENT DOCUMENTS

| | | | |
|---|---|---|---|
| 8,872,979 B2* | 10/2014 | Bagga | G06F 17/30796 |
| | | | 348/699 |
| 9,122,921 B2 | 9/2015 | Beato et al. | |
| 9,305,239 B2 | 4/2016 | Litvak | |
| 9,367,766 B2 | 6/2016 | Wang et al. | |
| 9,456,170 B1 | 9/2016 | Miller et al. | |
| 2002/0154220 A1 | 10/2002 | Dieterich | |
| 2003/0179199 A1 | 9/2003 | Deering et al. | |
| 2005/0117889 A1 | 6/2005 | Seita | |
| 2007/0154171 A1 | 7/2007 | Elcock et al. | |
| 2007/0253680 A1 | 11/2007 | Mizote et al. | |
| 2008/0166106 A1 | 7/2008 | Ozawa et al. | |
| 2009/0060055 A1 | 3/2009 | Blanchard et al. | |
| 2009/0228941 A1* | 9/2009 | Russell | H04N 17/04 |
| | | | 725/107 |
| 2009/0259633 A1* | 10/2009 | Bronstein | G06F 17/30799 |
| 2009/0273711 A1 | 11/2009 | Chapdelaine et al. | |
| 2009/0310021 A1 | 12/2009 | Kondo et al. | |
| 2010/0328529 A1* | 12/2010 | Hirayama | G06K 9/3266 |
| | | | 348/452 |
| 2010/0329547 A1* | 12/2010 | Cavet | G06F 17/30802 |
| | | | 382/164 |
| 2011/0050995 A1* | 3/2011 | Ozawa | H04H 20/18 |
| | | | 348/468 |
| 2011/0164673 A1 | 7/2011 | Shaffer | |
| 2011/0234900 A1 | 9/2011 | Quan | |
| 2012/0143606 A1* | 6/2012 | Pham | G10L 15/26 |
| | | | 704/235 |
| 2012/0281139 A1 | 11/2012 | Zhang et al. | |
| 2013/0010062 A1 | 1/2013 | Redmann | |
| 2013/0094836 A1 | 4/2013 | Gifford et al. | |
| 2014/0067828 A1 | 3/2014 | Archibong et al. | |
| 2014/0270702 A1* | 9/2014 | Hundemer | H04N 9/8715 |
| | | | 386/244 |
| 2014/0282722 A1* | 9/2014 | Kummer | H04N 21/23418 |
| | | | 725/35 |
| 2014/0304731 A1* | 10/2014 | Dhawan | G06Q 30/00 |
| | | | 725/32 |
| 2014/0379935 A1* | 12/2014 | Venkatasubramaniam | H04L 65/80 |
| | | | 709/231 |
| 2015/0095929 A1 | 4/2015 | Lee | |
| 2015/0201247 A1* | 7/2015 | Henderson | H04N 21/4886 |
| | | | 725/5 |
| 2015/0294620 A1 | 10/2015 | Cho et al. | |
| 2015/0365716 A1* | 12/2015 | Fonseca, Jr. | H04N 5/44543 |
| | | | 725/41 |
| 2015/0379908 A1 | 12/2015 | Kim | |

\* cited by examiner

| | |
|---|---|
| 1.bmp | Bitmap: Match |
| | Duration: Mismatch (Reference: 183, Test: 24, Delta: 159) |
| | Time Point: Match |
| | Anchor Point: Match |
| 2.bmp | Bitmap: Match |
| | Duration: Match |
| | Time Point: Match |
| | Anchor Point: Match |
| 3.bmp | Bitmap: Match |
| | Duration: Match |
| | Time Point: Match |
| | Anchor Point: Match |

Bitmap Mismatches (%): 0

Bitmap Missing (%): 0

Duration Mismatch (%): 14.2857142857143

Timepoint Mismatch (%): 0

Anchorpoint Mismatch (%): 0

Log File
700

FIG. 7

CAPTION RENDERING AUTOMATION TEST FRAMEWORK

CROSS-REFERENCE TO RELATED APPLICATIONS

This application claims the benefit of U.S. Provisional Application No. 62/180,545, filed Jun. 16, 2015, which is hereby incorporated by reference.

FIELD

Embodiments of the invention relate to the field of media systems, and more specifically, to the automatic validation of closed caption (CC) rendering.

BACKGROUND

In any software solution that deals with rendering closed captions or subtitles on a television (TV) screen along with the video content, a verification of closed captions or subtitles being rendered correctly is required. For closed captions this means verifying that the closed captions have the correct content, duration, styles (e.g., font, foreground color, background color, etc.), and language. Validation that the rendered closed captions meet the standards specification is also required. Due to the complicated nature of this problem, this verification is typically performed manually by a software tester visually inspecting the output on the screen. This type of manual testing needs to be done after every update to the software solution in order to ensure that the closed captions rendering is still functioning correctly. This software testing can be a tedious, labor intensive task leaving a large footprint for potential software bugs which necessitates an automation framework.

Conventional solutions that deal with this problem use speech to text technology to match the spoken word with the closed captioning from the metadata manifest file included as part of the video source. Such a solution, however, can only validate the content and not style of the closed caption. The speech to text solution also does not test closed captioning rendering. If the software has bugs in rendering the source file, they will not be identified since the speech to text solution is not an end-to-end black box solution. Speech to text does not have a high accuracy if the video content is noisy and the accuracy drastically reduces when using languages other than English.

SUMMARY

Exemplary methods performed by a processing system that is communicatively coupled to an audio video (AV) source capable of performing closed caption (CC) rendering, for determining whether the AV source is performing CC rendering properly, includes receiving a set of one or more reference AV streams from the AV source, and generating reference CC images from the set of one or more reference AV streams starting from a recording start time to a recording stop time. The methods further include receiving a set of one or more test AV streams from the AV source, and generating test CC images from the set of one or more test AV streams starting from the recording start time to the recording stop time. The methods further include determining whether the AV source is performing CC rendering properly by automatically comparing the test CC images against the reference CC images.

According to one embodiment, the methods further include determining that the AV source has a new software upgrade, and in response to determining that the AV source has the new software upgrade, automatically communicating with the AV source to cause the AV source to send the set of one or more test AV streams.

According to one embodiment, the methods further include generating reference metadata from the set of one or more reference AV streams, generating test metadata from the set of one or more test AV streams, and determining whether the AV source is performing CC rendering properly by automatically comparing the test metadata against the reference metadata.

According to one embodiment, the reference metadata includes a reference position indicating a position of a reference CC image in a reference video frame of the set of one or more reference AV streams, and wherein the test metadata includes a test position indicating a position of a test CC image in a test video frame of the set of one or more test AV streams.

According to one embodiment, automatically comparing the test metadata against the reference metadata comprises determining whether a difference between a position of a test CC image and a position of a corresponding reference CC image exceeds a position mismatch tolerance, wherein the position mismatch tolerance is configurable.

According to one embodiment, the reference metadata includes a reference frame count indicating a number of reference video frames of the set of one or more reference AV streams in which a reference CC image is present, and wherein the test metadata includes a test frame count indicating a number of test video frames of the set of one or more test AV streams in which a test CC image is present.

According to one embodiment, automatically comparing the test metadata against the reference metadata comprises determining whether a difference between a frame count of a test CC image and a frame count of a corresponding reference CC image exceeds a frame count mismatch tolerance, wherein the frame count mismatch tolerance is configurable.

According to one embodiment, the reference metadata includes a reference time point indicating a time relative to the recording start time at which a reference CC image appears on a reference video frame of the set of one or more reference AV streams, wherein the test metadata includes a test time point indicating a time relative to the recording start time at which a test CC image appears on a test video frame of the set of one or more test AV streams.

According to one embodiment, automatically comparing the test metadata against the reference metadata comprises determining whether a difference between a time point of a test CC image and a time point of a corresponding reference CC image exceeds a time point mismatch tolerance, wherein the time point mismatch tolerance is configurable.

According to one embodiment, automatically comparing the test CC images against the reference CC images comprises determining whether a number of mismatched pixels between a test CC image and a corresponding reference CC image exceeds a pixel mismatch tolerance, wherein the pixel mismatch tolerance is configurable.

According to one embodiment, the methods further include generating an image result comprising of a reference CC image, a test CC image, and a superimposed CC image comprising of the reference CC image and the test CC image superimposed on each other.

BRIEF DESCRIPTION OF THE DRAWINGS

The invention may best be understood by referring to the following description and accompanying drawings that are used to illustrate embodiments of the invention. In the drawings:

FIG. 7 is a diagram illustrating a generated log file according to one embodiment.

DESCRIPTION OF EMBODIMENTS

Figure 1:
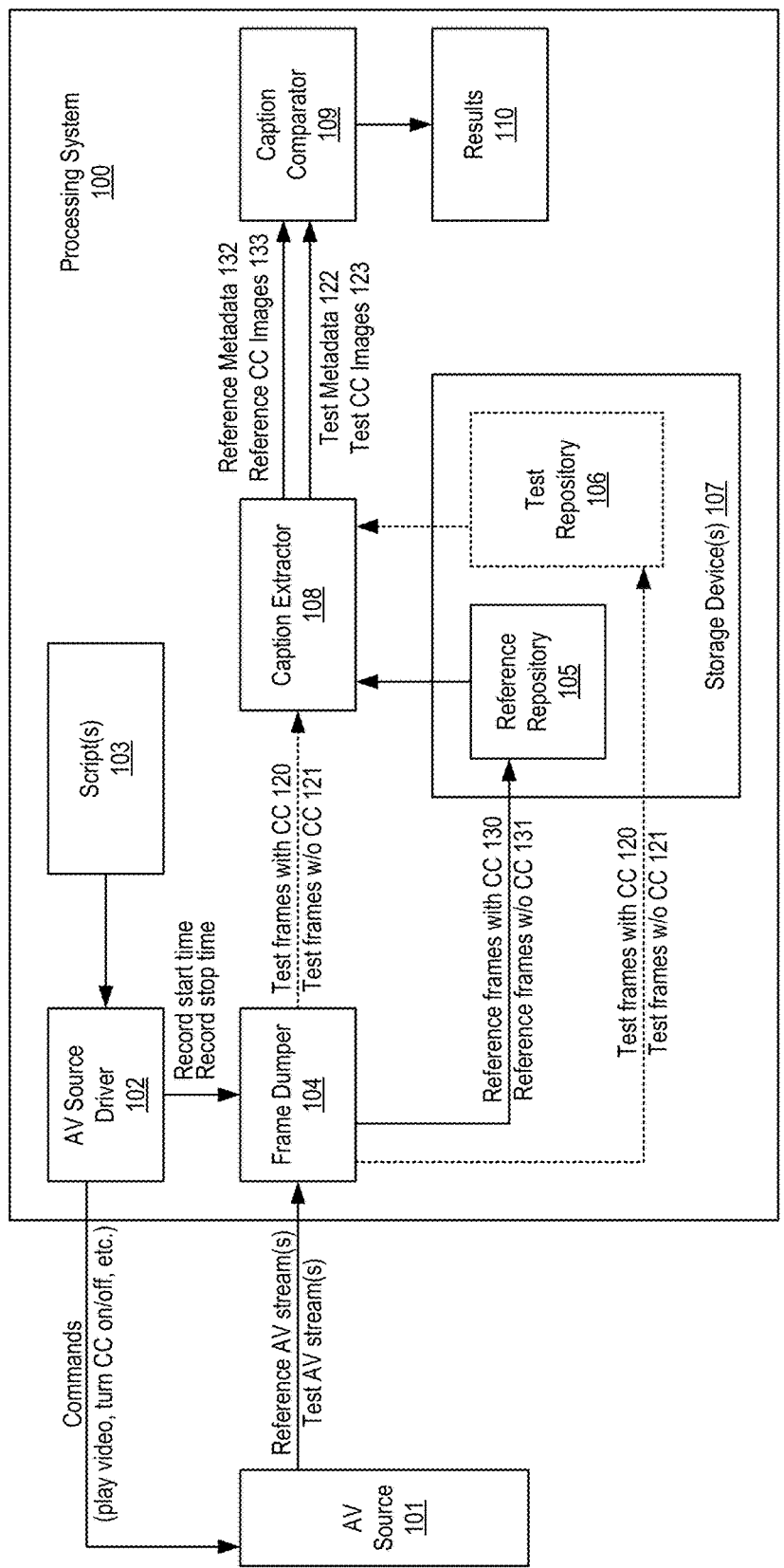
FIG. 1 is a block diagram illustrating a processing system for automatically testing CC rendering according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or processing system stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Techniques for automatically testing closed caption (CC) rendering are described herein. According to one embodiment, a processing system for automatically testing CC rendering is communicatively coupled to an audio/video (AV) source capable of performing CC rendering. The processing system, in one embodiment, includes an AV source driver configured to perform various tasks, including, for example, communicating with the AV source to cause the AV source to perform various operations described herein. In one embodiment, the AV source driver is to perform one or more of the tasks described herein by processing/interpreting one or more user-created scripts.

In one embodiment, the AV source driver is configured communicate with the AV source to cause the AV source to send a first reference AV stream to the processing system. As used herein, a "reference AV stream" refers to an AV stream wherein the CC rendering is manually verified (e.g., by a tester visually inspecting the CC displayed on the screen) and determined to be correct. In one embodiment, the AV source driver is further configured to communicate with the AV source to cause the AV source to send a second reference AV stream to the processing system. In an embodiment where multiple reference AV streams are sent to the processing system, the AV source driver is configured to cause the AV source to send at least one reference AV stream without CC, and at least one reference AV stream with CC.

According to one embodiment, the processing system further includes a frame dumper, and the AV source driver is further configured to program the frame dumper with a recording start time and a recording stop time. As used herein, a "recording start time" refers to a time in the AV stream wherein the frame dumper is to start capturing and extracting video frames from, and a "recording stop time" refers to a time in the AV stream wherein the frame dumper is to stop capturing and extracting frames. The duration between the recording start time and the recording stop time shall herein be referred to as the "recording session". Throughout the description, "video frame" is interchangeably referred to as "frame".

The frame dumper, in one embodiment, is to extract reference frames from the reference AV streams and store the extracted reference frames in a reference repository at one or more storage devices accessible by the processing system. In an embodiment where the reference AV streams are sent with and without CC, the frame dumper is to extract reference frames from both the reference AV stream without CC and the reference AV stream with CC, and store them in the reference repository.

According to one embodiment, the AV source driver is further configured to determine whether a software upgrade has been performed at the AV source. In response to determining a software upgrade has been performed at the AV source, the AV source driver is to automatically communicate with the AV source to cause the AV source to send a first test AV stream to the processing system. As used herein, a "test AV stream" refers to an AV stream wherein the CC is to be automatically verified/tested by being automatically compared against the reference AV stream without requiring a tester to manually inspect the CC of the test AV stream. It should be noted that the test AV stream should be the same as the reference AV stream except that the CC rendering is performed by the upgraded software in the case of the test AV stream. In one embodiment, the AV source driver is further configured to communicate with the AV source to cause the AV source to send a second test AV stream to the processing system. In an embodiment where multiple test AV streams are sent to the processing system, the AV source driver is configured to cause the AV source to send at least one test AV stream without CC, and at least one test AV stream with CC.

In response to determining a software upgrade has been performed at the AV source, the AV source driver is configured to cause the frame dumper to perform operations on the test AV streams similar to the operations it performed on the reference AV streams. This is done by using the same script during testing that was used during generation of reference data. For example, the AV source driver is configured to program the frame dumper with the same recording start time and recording stop time to cause the frame dumper to start and stop capturing/extracting test frames from the test AV streams at the same start and stop point as the start and stop point, respectively, of the reference AV streams. The frame dumper, in one embodiment, is to extract test frames from the test AV streams and store the extracted test frames in a test repository at one or more storage devices accessible by the processing system. In an embodiment where the test AV streams are sent with and without CC, the frame dumper is to extract test frames from both the test AV stream without CC and the test AV stream with CC, and store them in the test repository.

According to one embodiment, the processing system further includes a caption extractor configured to generate/extract reference CC images from the reference frames and generate/extract test CC images from the test frames. In one embodiment, the caption extractor extracts a CC image by performing caption filtering. In another embodiment, the caption extractor extracts a CC image by performing caption clipping. Other mechanisms for extracting CC images, however, can be implemented without departing from the broader scope and spirit of the present invention.

In one embodiment, the caption extractor is configured to generate reference metadata for the reference frames and test metadata for the test frames. In one such embodiment, the metadata includes, but is not limited to, position metadata, frame count metadata, and time point metadata, or any combination thereof. The position metadata indicates the coordinate (e.g., the top left X, Y coordinate) of a CC image in the frame. The frame count metadata indicates the number of frames for which a CC image is in the AV stream (e.g., the number of frames that the CC image is displayed on the screen). The time point metadata indicates the time at which the CC image appeared in the AV stream, relative to the recording start time.

In one embodiment, the processing system includes a caption comparator configured to compare the test CC images against the reference CC images, and to determine whether they are the same, or differ within a configurable tolerance. Alternatively, or in addition to, the caption comparator is configured to compare one or more test metadata against one or more respective reference metadata to determine if they are the same, or differ within a respective configurable tolerance. According to one embodiment, the caption comparator is to generate results of the comparison in the form of an image and/or log file. Various embodiments of the present invention shall now be described in greater details through the discussion of various figures below.

FIG. 1 is a block diagram illustrating a processing system for automatically testing CC rendering according to one embodiment. In the illustrated embodiment, processing system 100 is communicatively coupled to AV source 101, which can be any type of device capable of rendering CC. For example, AV source 101 can be a workstation, laptop, netbook, tablet, palm top, mobile phone, smartphone, phablet, multimedia phone, terminal, portable media player, global positioning system (GPS) unit, wearable device, gaming system, set-top box, Internet enabled household appliance, etc.

Processing system 100 includes AV source driver 102, which can be implemented in software, firmware, hardware, or any combination thereof. For example, AV source driver 102 can be implemented as a scripting engine. As used herein, a "scripting engine" is an interpreter that is responsible for converting a script (e.g., script(s) 103) into machine code at execution time. Thus, for example, script(s) 103 may include programmatic instructions, which when interpreted by AV source driver 102, causes AV source driver 102 to perform one or more of the tasks/operations described herein (e.g., controlling AV source 101 and frame dumper 104). AV source driver 102 is communicatively coupled to AV source 101, either directly or via a network. AV source driver 102 is to communicate with AV source 101 (e.g., using a protocol such as Hypertext Transfer Protocol (HTTP)) to cause AV source 101 to perform various operations (e.g., play a video, turn on/off closed caption, etc.).

In one embodiment, AV source driver 102 is configured to communicate with AV source 101 to cause AV source 101 to send a first reference AV stream to processing system 100. In one embodiment, AV source driver 102 is further configured to communicate with AV source 101 to cause AV source 101 to send a second reference AV stream to processing system 100. In an embodiment where multiple reference AV streams are sent to processing system 100, AV source driver 102 is configured to cause AV source 101 to send at least one reference AV stream without CC, and at least one reference AV stream with CC.

Figure 2:
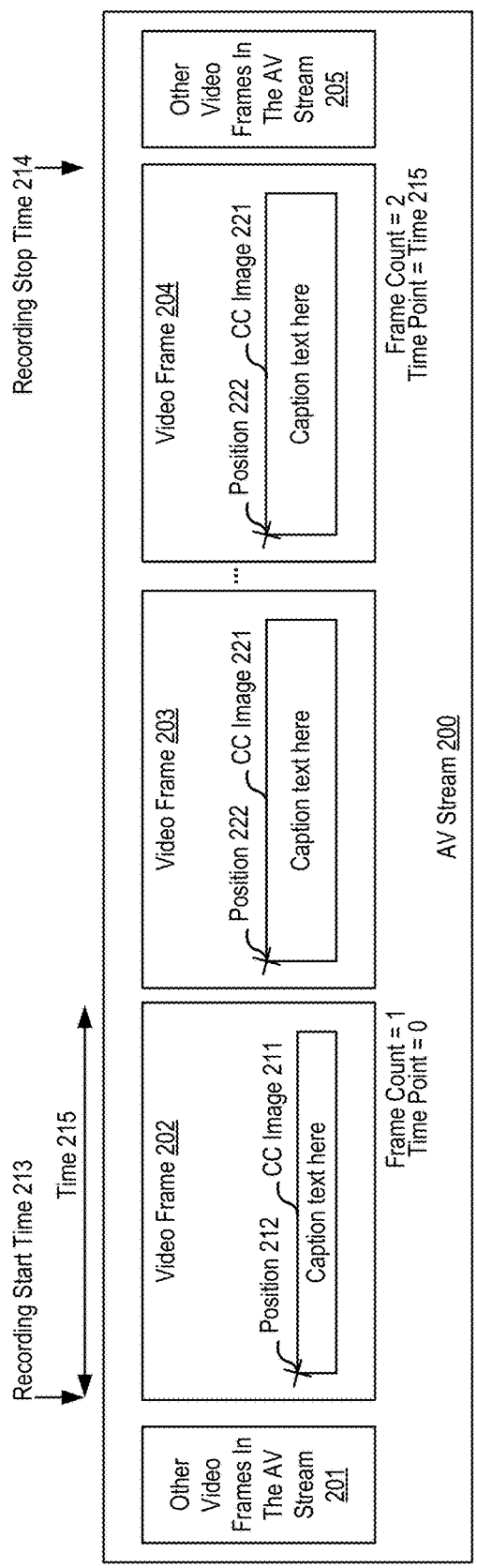
FIG. 2 is a block diagram illustrating an example of an AV stream according to one embodiment.

FIG. 2 is a block diagram illustrating an example of an AV stream. AV stream 200 includes frames 201-205. It should be understood, however, that the present invention is not so limited, and applies equally to any AV stream comprising of any number of frames. In the illustrated example, recording start time 213 is pointing to the beginning of frame 202, and recording stop time 214 is pointing at the end of frame 204. Thus, frames 202-204 are to be captured and extracted from AV stream 200 by processing system 100.

Frame 202 includes CC image 211 wherein the top left of CC image 211 is located at position 212 within the frame. As used herein, a "CC image" refers to an image containing the CC text that is displayed on the screen. Frame 202 has a duration of time 215. Each of frames 203-204 includes CC image 221 wherein the top left of CC image 221 is located at position 222 within the frame. In this example, CC image 211 is present in only frame 202, thus the frame count metadata associated with CC image 211 is 1. The same CC image 221 is present in frames 203-204, thus the frame count metadata associated with CC image 221 is 2. It should be noted that although the illustrated recording session includes only CC image 211 and CC image 221, the present invention is not so limited, and applies equally to any recording session comprising of any number of CC images.

Referring now back to FIG. 1. According to one embodiment, processing system 100 further includes frame dumper 104, which can be implemented in software, firmware, hardware, or any combination thereof. In one embodiment, frame dumper 104 is communicatively coupled to AV source 101 either directly or via a network using any type of AV interface. In one embodiment, frame dumper 104 may be communicatively coupled to AV source 101 via a video capture card that includes an AV interface, such as, for example, a High-Definition Multimedia Interface (HDMI) interface. In one such embodiment, frame dumper 104 communicates with AV source 101 using the application programming interface (API) of the video capture card. One having ordinary skills in the art would recognize that frame dumper 104 and AV source 101 may be communicatively coupled using any other type of AV interface.

In one embodiment, AV source driver 102 is configured to program frame dumper 104 with a recording start time and a recording stop time to cause frame dumper 104 to start extracting frames from the reference AV streams at the recording start time, and stop capturing and stop extracting frames from the reference AV streams at the recording stop time. Frame dumper 104 is to extract reference frames from the reference AV streams and store the extracted reference frames in reference repository 105 at storage devices 107. In an embodiment where the reference AV streams are sent with and without CC, frame dumper 104 is to extract reference frames from both the reference AV stream without CC and the reference AV stream with CC, and store them in reference repository 105. In this example, frame dumper 104 extracts reference frames with CC 130 and reference frames without CC 131 from reference AV streams with and without CC, respectively.

According to one embodiment, AV source driver 102 is configured to determine whether a software upgrade has been performed at AV source 101. In one such embodiment, AV source driver 102 determines whether a software upgrade has been performed at AV source 101 by communicating with AV source 101 to determine if certain predetermined files have been created or modified since the last time AV source driver 102 checked. Alternatively, or in addition to, AV source driver 102 may determine if there has been a software upgrade by checking a software version number stored at a predetermined register or memory location at AV source 101. Various other mechanisms for determining whether a software upgrade has been performed at AV source 101 can be implemented without departing from the broader scope and spirit of the present invention.

In response to determining a software upgrade has been performed at AV source 101, AV source driver 102 is to automatically communicate with AV source 101 to cause AV source 101 to send a first test AV stream to processing system 100. In one embodiment, AV source driver 102 is further configured to communicate with AV source 101 to cause AV source 101 to send a second test AV stream to processing system 100. In an embodiment where multiple test AV streams are sent to processing system 100, AV source driver 102 is configured to cause AV source 101 to send at least one test AV stream without CC, and at least one test AV stream with CC. It should be understood that the test AV stream is the same as the reference AV stream, except that the CC rendering in the test AV stream is performed by the upgraded software.

In response to determining a software upgrade has been performed at AV source 101, AV source driver 102 is configured to cause frame dumper 104 to perform operations on the test AV streams similar to the operations it performed on the reference AV streams. For example, AV source driver 102 is configured to program frame dumper 104 with the same recording start time and recording stop time to cause frame dumper 104 to start and stop capturing/extracting test frames from the test AV streams at the same start and stop point as the start and stop point, respectively, of the reference AV streams. Frame dumper 104, in one embodiment, is to extract test frames from the test AV streams and store the extracted test frames in test repository 106 at storage devices 107. In an embodiment where the test AV streams are sent with and without CC, frame dumper 104 is to extract test frames from both the test AV stream without CC and the test AV stream with CC, and store them in test repository 106. In this example, frame dumper 104 extracts test frames with CC 120 and test frames without CC 121 from test AV streams with and without CC, respectively.

It should be understood that storing extracted test frames with CC 120 and test frames without CC 121 in test repository 106 is optional. For example, frame dumper 104 may send extracted test frames with CC 120 and test frames without CC 121 directly to caption extractor 108, instead of storing them in test repository 106.

Processing system 100 further includes caption extractor 108, which can be implemented in software, firmware, hardware, or any combination thereof. Caption extractor 108 is configured to generate/extract reference CC images from the reference frames and extract test CC images from the test frames. In one embodiment, caption extractor 108 extracts a CC image by performing caption filtering. In another embodiment, caption extractor 108 extracts a CC image by performing caption clipping. Caption filtering and caption clipping are described in further details below. In this example, caption extractor 108 generates reference CC images 133 based on at least reference frames with CC 130. In one embodiment, caption extractor 108 generates reference CC images 133 further based reference frames without CC 131. Caption extractor 108 also generates test CC images 123 based on at least test frames with CC 120. In one embodiment, caption extractor 108 generates test CC images 123 further based test frames without CC 121. By way of example, referring now to FIG. 2, caption extractor 108 extracts CC image 211 from frame 202, and CC image 221 from frames 203-204.

Referring now back to FIG. 1, in one embodiment, caption extractor 108 is further configured to generate reference metadata for the reference frames and test metadata for the test frames. In one such embodiment, the metadata includes, but is not limited to, position metadata, frame count metadata, and time point metadata, or any combination thereof. The position metadata, frame count metadata, and time point metadata are described above. In this example, caption extractor 108 generates reference metadata 132 based on at least reference frames with CC 130. In one embodiment, caption extractor 108 generates reference metadata 132 further based on reference frames without CC 131. Caption extractor 108 generates test metadata 122 based on at least test frames with CC 120. In one embodiment, caption extractor 108 generates test metadata 122 further based on test frames without CC 121. By way of example, referring now to FIG. 2, caption extractor 108 generates the following metadata associated with CC image 211: 1) position=position 212, 2) frame count=1, and 3) time point=0; and further generates the following metadata associated with CC image 221: 1) position=position 222, 2) frame count=2, and 3) time point=time 215.

It should be noted that caption extractor 108 generates the metadata described herein based on the frames extracted from the AV streams, and not based on any of the metadata that is included as part of the AV streams. In this way, processing system 100 is able to perform testing of CC rendering using the "black-box" approach, resulting in many advantages (described below) over the conventional approach.

Referring now back to FIG. 1, processing system 100 further includes caption comparator 109, which can be implemented in software, firmware, hardware, or any combination thereof. Caption comparator 109 is configured to compare the test CC images against the reference CC images, and to determine whether they are the same, or differ within a configurable tolerance. For example, caption comparator 109 compares test CC images 123 against reference CC images 133 to determine if the CC are the same in both the reference AV streams and the test AV streams. In such an embodiment, caption comparator 109 is able to determine if the CC in the test AV streams and the reference AV streams have the same content, styles (e.g., font, foreground color, background color, window, panel, and opacity), and language.

According to one embodiment, caption comparator 109 compares the CC images as bitmap images. For example, caption comparator 109 compares each pixel of test CC images 123 against a corresponding pixel of corresponding reference CC images 133. According to one embodiment, caption comparator 109 is configured with a pixel mismatch tolerance that indicates a threshold of allowable mismatched pixels. In such an embodiment, caption comparator 109 reports a CC rendering mismatch if the number of mismatched pixels exceed the configured pixel mismatch tolerance. The pixel mismatch tolerance can be in the unit of integer, which represents an allowable mismatch percentage or a raw number of allowable mismatched pixels.

Alternatively, or in addition to, caption comparator 109 is configured to compare one or more test metadata against one or more corresponding reference metadata to determine if they are the same, or differ within a corresponding configurable tolerance. For example, caption comparator 109 may compare position metadata of test metadata 122 against position metadata of reference metadata 132. According to one embodiment, caption comparator 109 is configured with a position mismatch tolerance that indicates a threshold of allowable mismatched position. For example, the position mismatch tolerance may include a tolerance in the X axis, and a tolerance in the Y axis (both in unit of integer). In such an embodiment, caption comparator 109 reports a CC rendering mismatch if the mismatch in the X axis exceeds the tolerance in the X axis and/or the mismatch in the Y axis exceeds the tolerance in the Y axis.

Caption comparator 109 may compare frame count metadata of test metadata 122 against frame count metadata of reference metadata 132. According to one embodiment, caption comparator 109 is configured with a frame count mismatch tolerance (in unit of integer) that indicates a threshold of allowable mismatched frame count. In such an embodiment, caption comparator 109 reports a CC rendering mismatch if the frame count mismatch exceeds the configured frame count mismatch tolerance. By comparing the frame count metadata, caption comparator 109 is able to determine if there is a mismatch in the duration of when a CC image from the test AV stream appears on the screen and the duration of when the corresponding reference CC image from the reference AV stream appears on the screen.

Caption comparator 109 may compare time point metadata of test metadata 122 against time point metadata of reference metadata 132. According to one embodiment, caption comparator 109 is configured with a time point mismatch tolerance (in unit of integer) that indicates a threshold of allowable mismatched time point. In such an embodiment, caption comparator 109 reports a CC rendering mismatch if the time point mismatch exceeds the configured time point mismatch tolerance. By comparing the time point metadata, caption comparator 109 is able to determine if there is a delay (i.e., time shift) between the reference CC image in the reference AV stream and the corresponding test CC image in the test AV stream.

According to one embodiment, caption comparator 109 is to generate results 110 of the comparison in the form of an image and/or log file. For example, results 110 may be an image comprising of a reference CC image, the corresponding test CC image, and an image comprising of the reference CC image and the corresponding test CC image superimposed on each other. The mismatched pixels in the resulting image can be, for example, highlighted with a configurable color. Results 110 can also be generated in the form of a log file that includes information indicating whether there are mismatches in the reference CC image and the corresponding test CC image (e.g., the results of the bitmap image comparison and/or the results of the metadata comparison).

Figure 3:
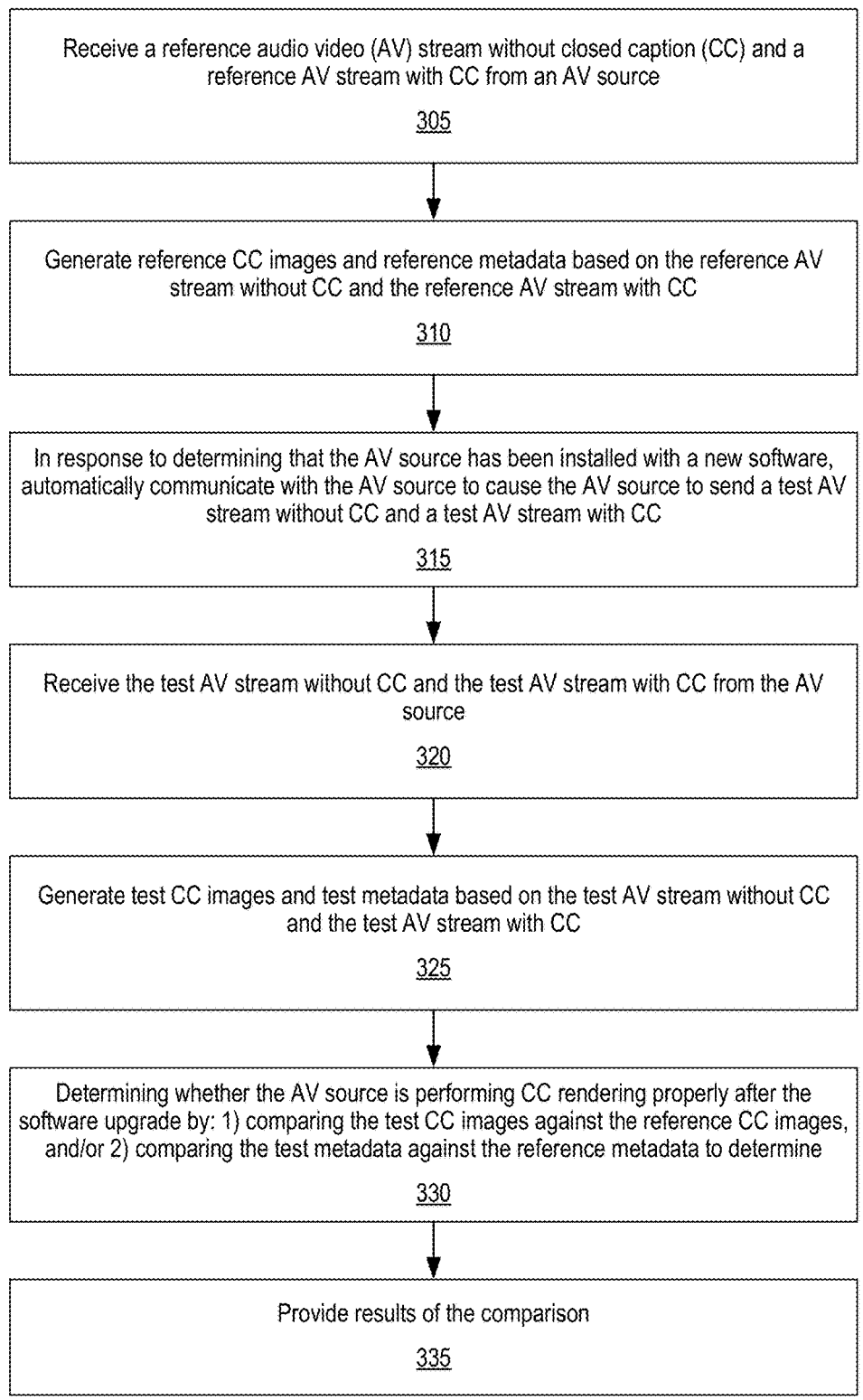
FIG. 3 is a flow diagram illustrating a method for automatically testing CC rendering according to one embodiment.

FIG. 3 is a flow diagram illustrating a method for automatically testing CC rendering according to one embodiment. For example, method 300 can be performed by processing system 100. Method 300 can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 3, at block 305, a processing system receives a reference AV stream without CC and a reference AV stream with CC from an AV source. For example, frame dumper 104 receives a reference AV stream without CC and a reference AV stream with CC from AV source 101. At block 310, the processing system generates reference CC images and reference metadata based on the reference AV stream without CC and the reference AV stream with CC. For example, frame dumper 104 extracts reference frames with CC 130 and reference frames without CC 131 from the reference AV stream with CC and the reference AV stream without CC, respectively. Caption extractor 108 then generates reference CC images 133 and reference metadata 132 from reference frames with CC 130 and reference frames without CC 131.

At block 315, in response to determining that the AV source has been installed with a new software, the processing system automatically communicates with the AV source to cause the AV source to send a test AV stream without CC and a test AV stream with CC. At block 320, the processing system receives the test AV stream without CC and the test AV stream with CC from the AV source. For example, in response to determining that AV source 101 has been upgraded with a new software, AV source driver 102 automatically causes AV source 101 to send a test AV stream without CC and a test AV stream with CC, wherein the test AV stream is the same as the reference AV stream, except that CC rendering in the test AV stream is performed by the upgraded software.

At block 325, the processing system generates test CC images and test metadata based on the test AV stream without CC and the test AV stream with CC. For example, frame dumper 104 extracts test frames with CC 120 and test frames without CC 121 from the test AV stream with CC and the test AV stream without CC, respectively. Caption extractor 108 then generates test CC images 123 and test metadata 122 from test frames with CC 120 and test frames without CC 121.

At block 330, the processing system determines whether the AV source is performing CC rendering properly after the software upgrade by: 1) comparing the test CC images against the reference CC images, and/or 2) comparing the test metadata against the reference metadata to. For example, caption comparator 109 compares test CC images 123 against reference CC images 133, and/or compares test metadata 122 against reference metadata 132, to determine if AV source 101 performs CC rendering properly after it has been upgraded with the new software. At block 335, the processing system provides the results of the comparison. For example, caption comparator 109 generates results 110 to provide the results of the comparison.

Figure 4:
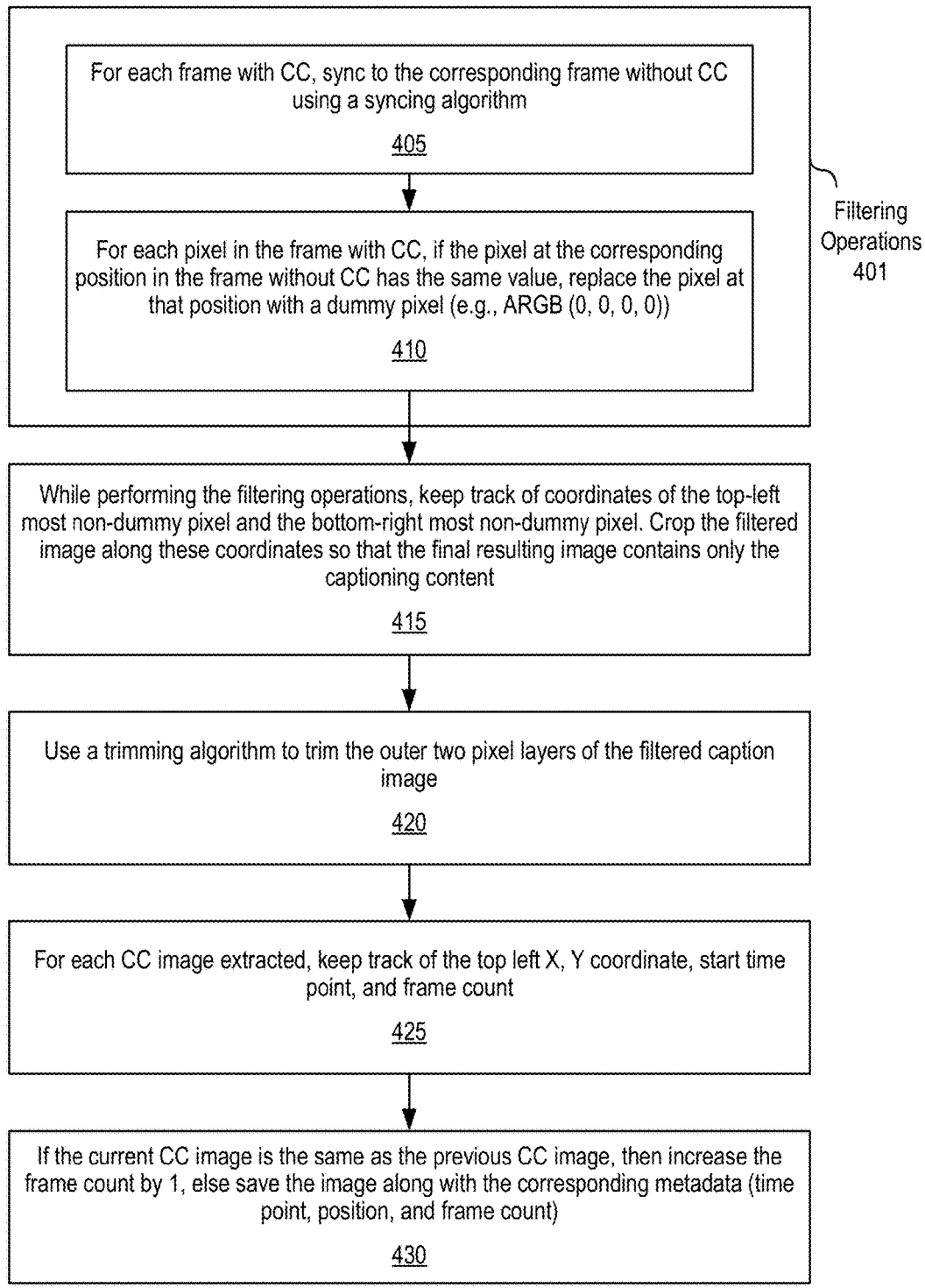
FIG. 4 is a flow diagram illustrating a method for extracting CC images according to one embodiment.

FIG. 4 is a flow diagram illustrating a method for performing caption extraction (cropping out the CC image from the video frame) according to one embodiment. This approach is called Caption Filter. For example, method 400 can be performed by caption extractor 108. Method 400 can be implemented in software, firmware, hardware, or any combination thereof.

Referring now to FIG. 4, method 400 includes filtering operations 401, which include blocks 405 and 410. At block 405, the caption extractor syncs each frame with CC to the corresponding frame without CC using a syncing algorithm (described below). At block 410, for each pixel in the frame with CC, if the pixel at the corresponding position in the frame without CC has the same value, the caption extractor replaces the pixel at that position with a dummy pixel (e.g., ARGB (0, 0, 0, 0)).

At block 415, while performing filtering operations 401, the caption extractor keeps track of coordinates of the top-left most non-dummy pixel and the bottom-right most non-dummy pixel. The caption extractor further crops the filtered image along these coordinates so that the final resulting image contains only the captioning content. At block 420, the caption extractor uses a trimming algorithm (described below) to trim the outer two pixel layers of the filtered captions image. These are the unwanted noisy pixels generated as an artefact of image compression.

At block 425, the caption extractor for each CC image extracted, keeps track of the top left X, Y coordinate, start time point, and frame count (i.e., the number of frames each CC image appears on the screen for). The frame count corresponds to the duration of each CC image. For example, if the frame count is 50, and the frame rate is 50 frames per second (fps), then the duration of the CC image is 1 second. At block 430, if the current CC image is the same as the previous CC image, then the caption extractor increases the frame count by 1. Otherwise, the caption extractor saves the CC image along with the corresponding metadata (e.g., time point, position, and frame count). This makes sure that the image is saved only when captioning content changes on the screen.

Syncing Algorithm

For caption filtering to function well, we need to make sure that each CC frame (i.e., frame with CC) is synced to the NoCC frame (i.e., frame without CC) In other words, all the pixels in the CC frame and the NoCC frame have the same value, excluding the CC pixels.

1. Syncing occurs at the beginning of the operation, or at any point where frame drops have occurred in either the CC image set or the NoCC image set.

2. Syncing is successful when T % of the pixels have the same value between the CC and NoCC frames, where T=Filter Threshold. T has been calculated empirically.

3. For efficient syncing, we insert a chunk of NoCC images in a hashmap. We then do a lookup of the CC image in this hashmap. The equals function is implemented so that it returns true only if sync is successful, based on the above criteria.

4. The insertion and lookup is sped up by implementing a special hash code function. We take advantage of the fact that any two frames of a video will differ in their outer pixel layer with high probability. So we don't need all the pixel data to differentiate one frame from another. We just need the border pixel layer to calculate the hash code. So we used the MD5 Crypto hash of the outer most pixel layer. So all frames with the same pixel layer will lie in the same bucket in the hash table. This technique has made hash table lookup really quick resulting in efficient syncing.

Trimming Algorithm

When dumping all the frames of a video that runs at 50 fps, we need to compress the frames in png format to reduce the disc space for long running videos. However when we make this compression, there is a layer of pixels around the captioning image, which gets modified. This is called pixel bleeding. This layer gets filtered out along with the captioning image. We need to trim this layer out after filtering. Trimming is complicated by the fact that the CC image filtered out might not be a rectangle. It can be of any polygonal shape. Also, there might be two CC images within the same frame. This happens when two people are speaking on screen. We've have written a custom algorithm to achieve this task.

The algorithm starts with a pixel at the corner of the image and goes along the edge checking if it is next to a dummy pixel or border of the image. It follows the process along all edges of the image to trim any noisy pixels.

Parallelizing

Caption filtering requires processing of thousands of images. Consider a 2 minute video running at 50 fps. It will generate 7500 images to filter, each image about 1.6 Mb for a 720p video. Processing these 7500 images takes time. So in order to make this process faster, we take advantage of multi core processing. The simplest solution is to process each frame in an independent thread. However, on account of frame drops, we have syncing issues. In that case the sync points would need to be communicated across all threads. This would make the process complicated. In order to circumvent this problem, we use a fork and join mechanism. This provided 8×increase on a 12 core Intel Xeon processor as compared to sequential filtering.

1. Find the first sync point between the CC/NoCC frame sets.
2. Create N threads, where N=number of processors.
3. Divide the CC/NoCC frames equally among the N threads and run the filter task in each thread. This would make sure that the syncing is performed independently within each thread and there's no communication across threads.
4. After all threads have completed, consolidate the results. At this point, it is possible that the last image of thread 'i' is same as the first image of thread 'i+1'. In that case ignore the image in thread i+1 and adjust the frame count accordingly.

Figure 5:
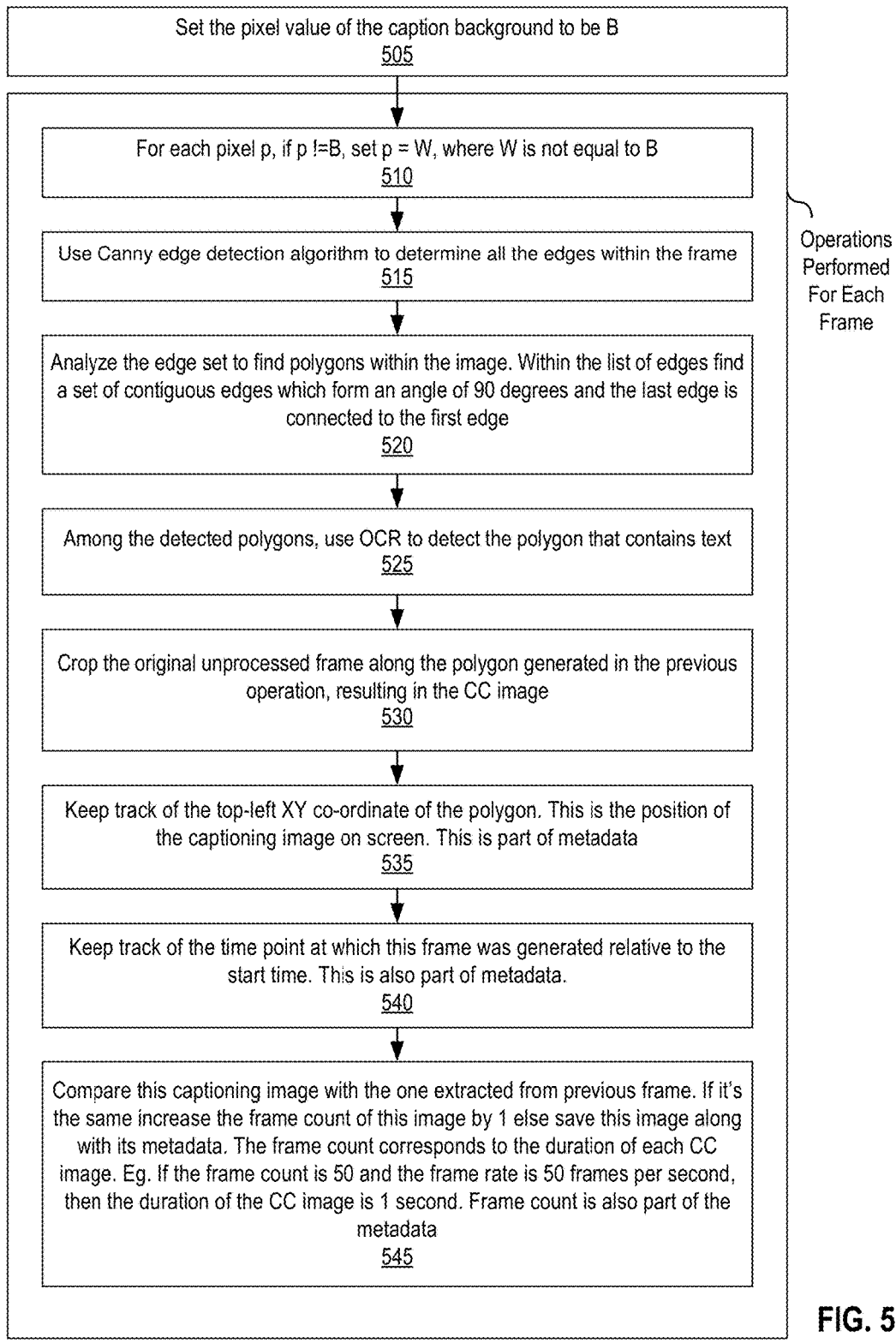
FIG. 5 is a flow diagram illustrating a method for extracting CC images according to one embodiment.

FIG. 5 is a flow diagram illustrating a method for performing caption clipping to extract CC images according to one embodiment. For example, method 500 can be performed by caption extractor 108. Method 500 can be implemented in software, firmware, hardware, or any combination thereof.

Referring now to FIG. 5, at block 505, we describe another implementation of the Caption extractor called the caption Clipper. In comparison with caption filter, this does not require a NoCC image. It directly crops the CC image out of the video frame. However it does require the CC content to have an opaque background with a known color, which is true in most cases. A caption extractor sets the pixel value of the caption background to be B. For each frame, the caption extractor performs operations 510-545. At block 510, for each pixel p, if p !=B, the caption extractor sets p=W, where W is not equal to B. At block 515, the caption extractor uses Canny edge detection algorithm to find out all the edges within the frame. At block 520, the caption extractor analyzes the edge set to find polygons within the image. Within the list of edges, the caption extractor finds a set of contiguous edges which form an angle of 90 degrees and the last edge is connected to the first edge.

At block 525, among the detected polygons, the caption extractor uses optical character recognition (OCR) to detect the polygon that contains text. At block 530, the caption extractor crops the original unprocessed frame along the polygon generated in the previous step. This is the desired final captioning image. At block 535, the caption extractor keeps track of the top-left XY co-ordinate of the polygon. This is the position of the captioning image on screen. This is part of metadata.

At block 540, the caption extractor keeps track of the time point at which this frame was generated relative to the start time. This is also part of metadata. At block 545, the caption extractor compares this captioning image with the one extracted from previous frame. If it is the same, the caption extractor increases the frame count of this image by 1. Otherwise, the caption extractor saves this image along with its metadata. The frame count corresponds to the duration of each CC image. For example, if the frame count is 50 and the frame rate is 50 frames per second, then the duration of the CC image is 1 second. Frame count is also part of the metadata. Once method 500 has been performed, the result is a list of CC images extracted from the AV stream along with its metadata.

Figure 6:
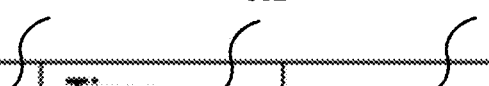
FIG. 6 is a block diagram illustrating generated metadata according to one embodiment.

FIG. 6 is a block diagram illustrating generated metadata according to one embodiment. Metadata 600 includes frame count metadata 601, time point metadata 602, and position metadata 603. In the illustrated example, the CC image file "1.bmp": 1) appears in the AV stream for 36 frames, 2) appears in the AV stream at time 00:00.00 relative to the recording start time, and 3) has a top left X, Y position at 222, 81. The CC image file "2.bmp": 1) appears in the AV stream for 79 frames, 2) appears in the AV stream at time 00:00.9 relative to the recording start time, and 3) has a top left X, Y position at 222, 81. The CC image file "3.bmp": 1) appears in the AV stream for 84 frames, 2) appears in the AV stream at time 00:03.7 relative to the recording start time, and 3) has a top left X, Y position at 221, 81. The CC image file "4.bmp": 1) appears in the AV stream for 21 frames, 2) appears in the AV stream at time 00:15.6 relative to the recording start time, and 3) has a top left X, Y position at 221, 525. The CC image file "5.bmp": 1) appears in the AV stream for 1 frame, 2) appears in the AV stream at time 00:17.9 relative to the recording start time, and 3) has a top left X, Y position at 221, 525. The CC image file "6.bmp": 1) appears in the AV stream for 1 frame, 2) appears in the AV stream at time 00:17.9 relative to the recording start time, and 3) has a top left X, Y position at 221, 525.

FIG. 7 is a diagram illustrating a generated log file according to one embodiment. For example, log file 700 can be implemented as part of results 110. Log file 700 includes the results for three test CC images, contained in files "1.bmp", "2.bmp", and "3.bmp". File "1.bmp" indicates that the first test CC image passes the bitmap image comparison (e.g., the content, style, language, etc., of the first test CC image matches the content, style, language, etc., of its corresponding reference CC image). File "1.bmp" indicates, however, that the frame count of the first test CC image does not match the frame count of its corresponding reference CC image. In particular, the first test CC image appears in the test AV stream for only 24 frames while the corresponding reference CC image appears in the reference AV stream for 183 frames, resulting in a delta of 159 frames. File "1.bmp" indicates that the first test CC image passes the time point comparison (i.e., the first test CC image appears in the test AV stream at the same time that its corresponding reference CC image appears in the reference AV stream). File "1.bmp" further indicates that the first test CC image passes the anchor point comparison (i.e., the first test CC image appears in the test frame at that same position that its corresponding reference CC image appears in the reference frame).

File "2.bmp" indicates that the second test CC image passes the bitmap comparison, duration comparison, time point comparison, and anchor point comparison. File "3.bmp" indicates that the third test CC image passes the bitmap comparison, duration comparison, time point comparison, and anchor point comparison.

Log file 700 further includes information summarizing the cumulative results of all three test CC images. In particular, log file 700 indicates that there is: 1) a 0% bitmap mismatch for all three test CC images, 2) 0% bitmap missing, 3) 14.285% duration mismatch, 4) 0% time point mismatch, and 5) 0% anchor point mismatch. In should be understood that the contents of log file 700 are shown for illustrative purposes, and not intended to be limitations of the present invention. More or less statistics can be included as part of log file 700.

Figure 8:
FIG. 8 is a block diagram illustrating an image result according to one embodiment.

FIG. 8 is a block diagram illustrating an image result according to one embodiment. For example, image result 800 can be implemented as part of results 110. Image result 800 includes reference CC image 801 at the top, corresponding test CC image 802 in the middle, and a superimposed CC image 803 at the bottom. Superimposed CC image 803 is an image of reference CC image 801 and test CC image 802 superimposed together. In this example, there is a content mismatch between reference CC image 801 and test CC image 802, which is illustrated in superimposed CC image 803. In one embodiment, the mismatched pixels between reference CC image 801 and test CC image 802 are highlighted in superimposed CC image 803 with a user defined color.

Embodiments of the present invention provide many advantages over the conventional approach to testing CC rendering. For example, the mechanisms described herein only require a one-time manual verification. Testing on all the subsequent test passes is an automated process allowing for early detection of regressions. The present mechanisms perform testing of captioning content and styles which include font, color, window, panel and opacity. Further, the present mechanisms perform testing of position of the captioning on screen, duration for which each captioning image is on screen, and the time point at which it appears. The present mechanisms apply equally to all closed captioning, regardless of the language used in the closed caption.

Further, the present mechanisms are independent of the video format used, e.g., the mechanisms do not require any metadata from the video file itself. So it can be used for verification of streams encoded with MPEG, AVI, MOV, MKV, etc.

The present mechanisms are also independent of video captioning standards. It can be used for verification of Closed Captions EIA-608, Closed Captions EIA-708, Teletext subtitles, etc.

Since the mechanisms described herein take the approach of "black-box" testing, they can be used for testing CC rendering on any video software running on any device (e.g., set-top box, personal computer, tablet or a gaming console, etc.).

Real Time Closed Caption Automation Testing

While embodiments have disclosed automatically testing CC that use a reference AV stream, in some embodiments testing CC can be automatically performed without the use of a reference AV stream. In one embodiment, the closed caption images from the final video output are extracted and compared with the source containing information, in near real time. This allows for a completely automated solution after the test is scripted and/or scheduled. This performs testing of captioning content and some styles depending on the captioning information available in the source: foreground color, background color and panel color; position of the captioning on screen, duration for which each captioning image is on screen and the time point at which it appears. The tool can be used to test EIA-608, EIA-708, subtitles, and teletext formats. This can be used for testing rendering capability of any video software running on any device (e.g., Set Top Box, Personal Computer, tablet or a gaming console, etc.). This also allows for use in various Operator or Partner labs.

Figure 9:
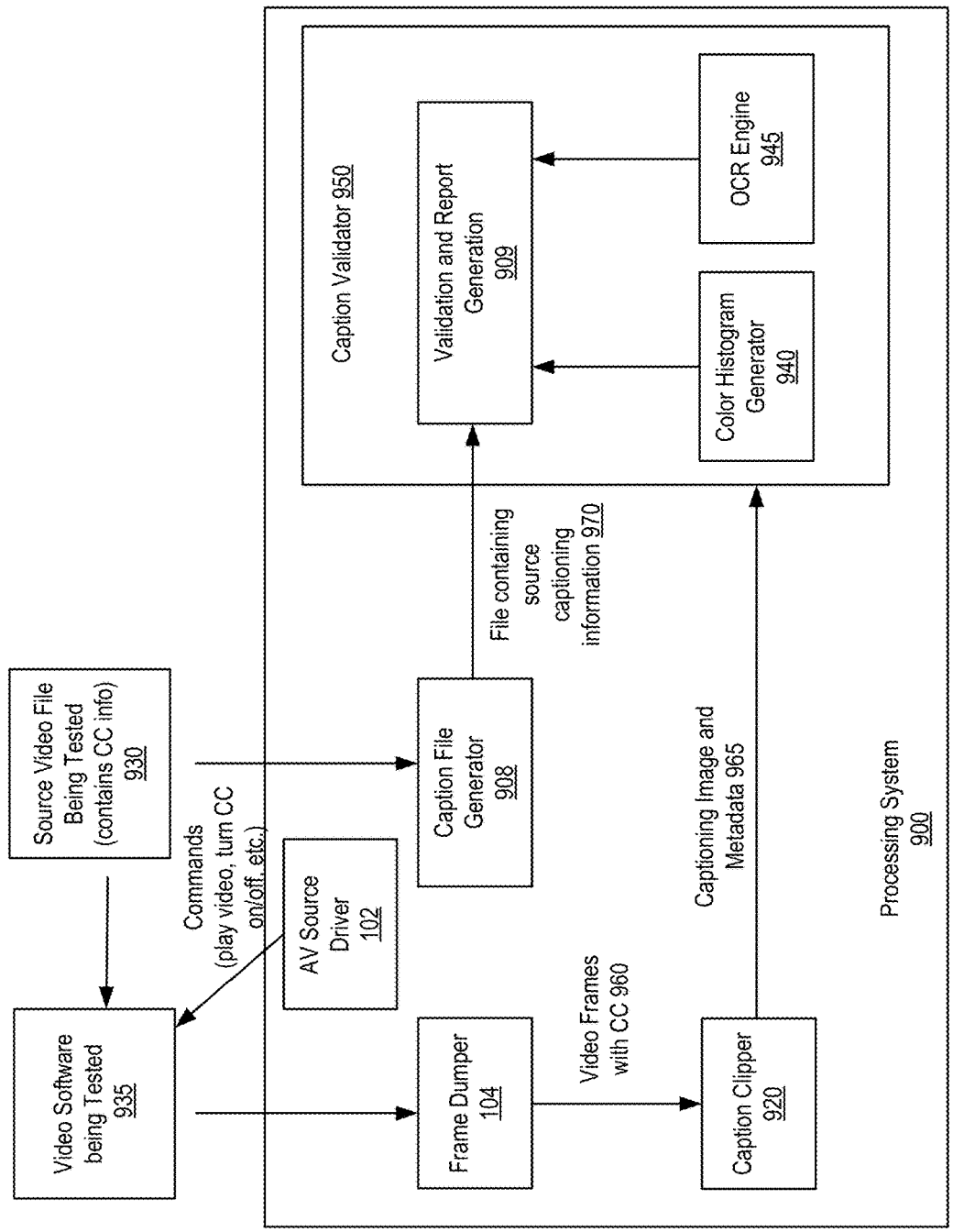
FIG. 9 illustrates a processing system for automatically testing CC rendering in real time according to one embodiment.

FIG. 9 illustrates a processing system for automatically testing CC rendering in real time according to one embodiment. In the illustrated embodiment, processing system 900 is communicatively coupled to the source video file being tested 930, which contains CC information. Processing system 900 includes AV source driver 102 and the frame dumper 104, as described above. The frame dumper 104 dumps all of the video running on the device and provides output in the form of video frames with CC information 960 to the caption clipper 920. The caption clipper 920 takes as input the video frames, detects the closed caption portion using Edge detection and OCR (Optical Character Recognition). It then crops out the Closed Caption image from the frame. Exemplary operations performed by the caption clipper 920 are described in detail with respect to FIG. 5. The caption clipper 920 outputs the following metadata: Position (the top left X,Y coordinate of the Closed Captioning image); frame count (the number of frames for which the Closed Captioning image is on screen): and time point (the time at which the Closed Captioning image appeared on screen, relative to the recording start time).

The processing system 900 also includes the caption file generator 908. The caption file generator 908 takes as input the source video file containing CC information 930 and generates a file containing all of the source captioning information 970 (referred hereinafter as the caption file 970). Examples of the file formats, typically used for storing this information are .srt or .xml. The caption file 970 is output to the caption validator 950, in particular the validation and report generation module 909. The captioning image and metadata 965 output by the caption clipper 920 is also input to the caption validator. The caption validator 950 receives the closed caption images and metadata and generates the necessary information to compare with the caption file 970, such as generating a color histogram of the image and performing OCR on the image. The caption validator 950 includes the color histogram generator 940 to generate a color histogram of the image. A color histogram contains the density of each pixel within the image that can be used to test whether the image has the correct foreground color, background color, or panel color. The caption validator 950 also includes the OCR engine 945 to determine the text from the closed captioning. The validation and report generation module 909 compares the caption file 970 against the information provided by the color histogram generator 940 and OCR engine 945 for the captioned images to determine whether they are the same, or differ within a configurable tolerance. For example, the validation and report generation module 909 is able to determine if the CC in the caption file 970 and the CC in the video frames extracted by the processing system 900 have the same content, some styles (foreground color, background color, panel color), positioning of the captioning on screen, duration for which each captioning image is on screen, and the time point at which it appears. The validation and report generation module 909 is configured to generate results in the form of an image and/or log file, as similar described with respect to FIG. 1.

Figure 10:
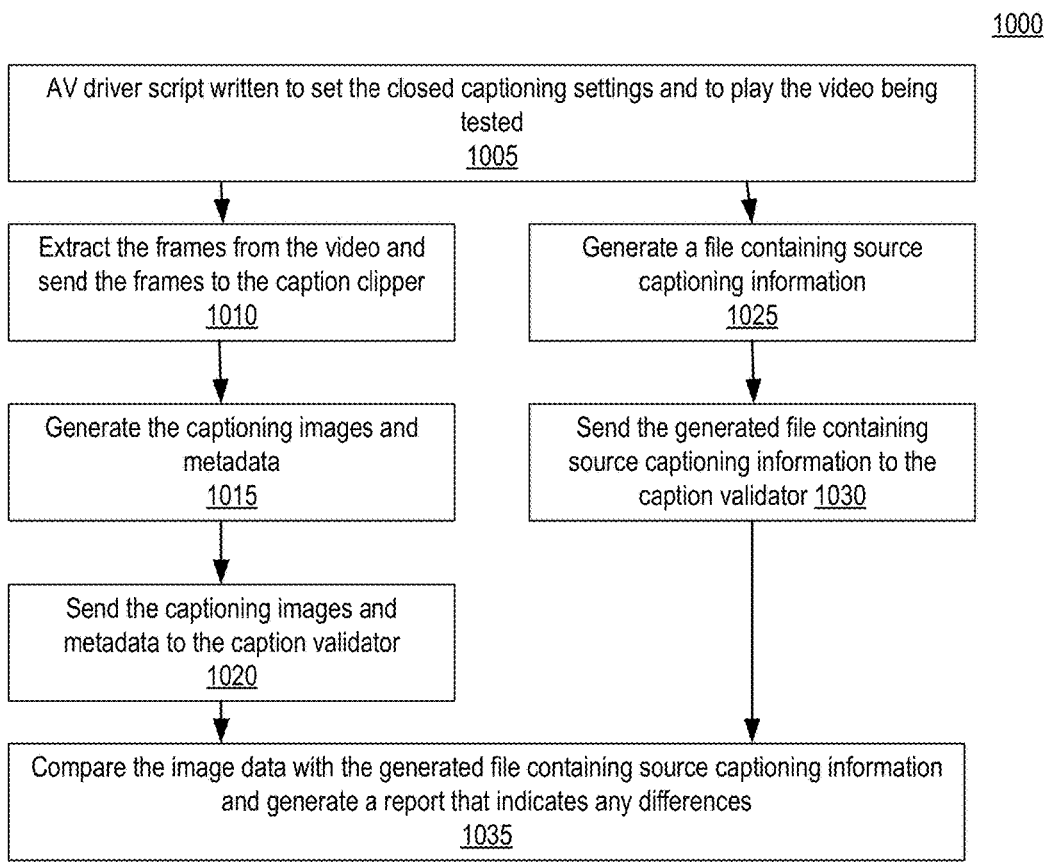
FIG. 10 is a flow diagram illustrating a method for automatically testing CC rendering in near real time according to one embodiment.

FIG. 10 is a flow diagram illustrating a method for automatically testing CC rendering in near real time according to one embodiment. Method 1000 can be performed by the processing system 900 and can be implemented in software, firmware, hardware, or any combination thereof. At block 1005, a tester writes an AV driver script to set the closed captioning settings and to play the video to be tested. Next, at block 1010, the frame dumper 104 extracts the frames from the video and sends the frames and sends the frames to the caption clipper 920. At block 1015, the caption clipper 920 generates the captioning images and metadata and at block 1020 sends the captioning images and metadata to the caption validator 950. At block 1025, which may be performed at substantially the same time as block 1010, the source video being tested 930 is received by the caption file generator 908 which generates the caption file 970. The caption file 970 is sent to the caption validator 950 at block 1030. Then, at block 1035, the caption validator 950 compares the image data with the file containing source captioning information and generates a report that indicates any differences.

The automated captioning testing described herein reduces the amount of manual validation activity TV software and TV service providers will need to invest. The captioning automation tool is a highly flexible and reliable tool for black box automation test of captioning rendering. This tool can be used for testing any video software on any platform and/or resolution. It performs this testing in real time and negligible manual effort.

Figure 11:
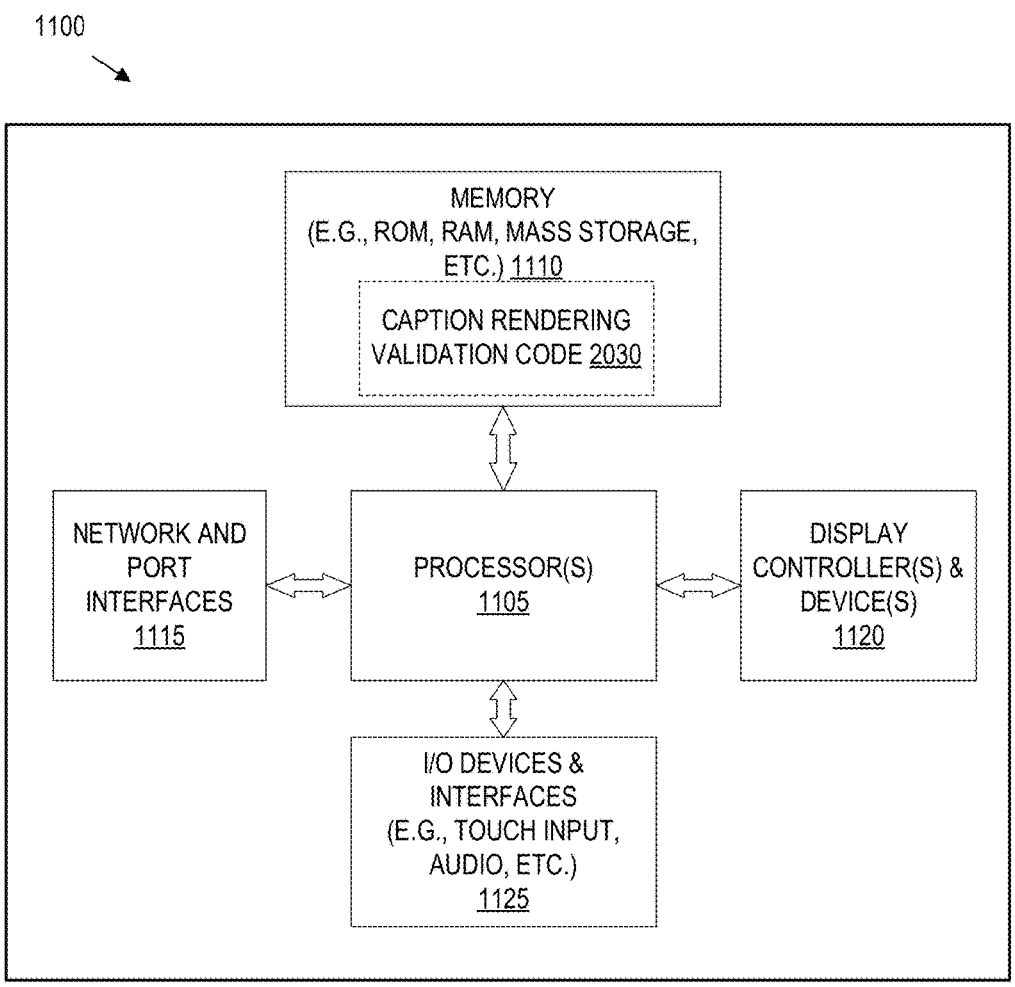
FIG. 11 is a block diagram illustrating an exemplary data processing system that may be used in some embodiments.

FIG. 11 illustrates a block diagram for an exemplary data processing system 1100 that may be used in some embodiments. Data processing system 1100 includes one or more microprocessors 1105 and connected system components (e.g., multiple connected chips). Alternatively, the data processing system 1100 is a system on a chip. One or more such data processing systems 1100 may be utilized to implement the functionality processing system 100 illustrated in FIG. 1 and/or the processing system 900 illustrated in FIG. 9.

The data processing system 1100 includes memory 1110, which is coupled to the microprocessor(s) 1105. The memory 1110 may be used for storing data, metadata, and programs for execution by the microprocessor(s) 1105. For example, the depicted memory 1110 may store caption rendering validation code 1130 that, when executed by the microprocessor(s) 1105, causes the data processing system 1100 (e.g., processing system 100) to automatically validate CC rendering by performing the operations described herein. The memory 1110 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1110 may be internal or distributed memory.

The data processing system 1100 also includes an audio input/output subsystem 1115 which may include a microphone and/or a speaker for, for example, playing back music or other audio, receiving voice instructions to be executed by the microprocessor(s) 1105, playing audio notifications, etc. A display controller and display device 1120 provides a visual user interface for the user, e.g., GUI elements or windows.

The data processing system 1100 also includes one or more input or output ("I/O") devices and interfaces 1125, which are provided to allow a user to provide input to, receive output from, and otherwise transfer data to and from the system. These I/O devices 1125 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1100.

The I/O devices and interfaces 1125 may also include a connector for a dock or a connector for a USB interface, FireWire, Thunderbolt, Ethernet, etc., to connect the system 1100 with another device, external component, or a network. Exemplary I/O devices and interfaces 1125 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1100 with another device, external component, or a network and receive stored instructions, data, tokens, etc. It will be appreciated that one or more buses may be used to interconnect the various components shown in FIG. 11.

It will be appreciated that additional components, not shown, may also be part of the system 1100, and, in certain embodiments, fewer components than that shown in FIG. 11 may also be used in a data processing system 1100. For example, in some embodiments where the data processing system 1100 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a processing system that is communicatively coupled to an audio video (AV) source capable of performing closed caption (CC) rendering, for determining whether the AV source is performing CC rendering properly, the method comprising:

receiving a set of one or more reference AV streams from the AV source;

generating reference CC images from the set of one or more reference AV streams starting from a recording start time to a recording stop time, wherein each one of the reference CC images is displayed on a screen and is associated with reference metadata, and wherein the reference metadata of a reference CC image include a reference position in a reference video frame of the set of one or more reference AV streams, and a reference frame count indicating a number of reference video frames of the set of one or more reference AV streams in which the reference CC image is present;

receiving a set of one or more test AV streams from the AV source;

generating test CC images from the set of one or more test AV streams starting from the recording start time to the recording stop time, wherein each one of the test CC images is associated with test metadata, wherein the test metadata of a test CC image include a test position in a test video frame of the set of one or more test AV streams, and a test frame count indicating a number of test video frames of the set of one or more test AV streams in which the test CC image is present; and determining whether the AV source is performing CC rendering properly by automatically comparing the test CC images against the reference CC images, and wherein automatically comparing the test CC images against the reference CC images includes determining whether a difference between a test frame count of a test CC image and a reference frame count of a corresponding reference CC image exceeds a frame count mismatch tolerance.

2. The method of claim 1, further comprising:
determining that the AV source has a new software upgrade; and
in response to determining that the AV source has the new software upgrade, automatically communicating with the AV source to cause the AV source to send the set of one or more test AV streams.

3. The method of claim 1, further comprising:
generating the reference metadata from the set of one or more reference AV streams; and
generating the test metadata from the set of one or more test AV streams.

4. The method of claim 1, wherein automatically comparing the test CC images against the reference CC images further includes determining whether a difference between a position of a test CC image and a position of a corresponding reference CC image exceeds a position mismatch tolerance.

5. The method of claim 4, wherein the position mismatch tolerance is configurable.

6. The method of claim 1, wherein the frame count mismatch tolerance is configurable.

7. The method of claim 3, wherein the reference metadata includes a reference time point indicating a time relative to the recording start time at which a reference CC image appears on a reference video frame of the set of one or more reference AV streams, wherein the test metadata includes a test time point indicating a time relative to the recording start time at which a test CC image appears on a test video frame of the set of one or more test AV streams.

8. The method of claim 7, wherein automatically comparing the test CC images against the reference CC images further includes determining whether a difference between a time point of a test CC image and a time point of a corresponding reference CC image exceeds a time point mismatch tolerance, wherein the time point mismatch tolerance is configurable.

9. The method of claim 1, wherein automatically comparing the test CC images against the reference CC images comprises determining whether a number of mismatched pixels between a test CC image and a corresponding reference CC image exceeds a pixel mismatch tolerance, wherein the pixel mismatch tolerance is configurable.

10. The method of claim 9, further comprising generating an image result comprising of a reference CC image, a test CC image, and a superimposed CC image comprising of the reference CC image and the test CC image superimposed on each other.

11. A processing system that is communicatively coupled to an audio video (AV) source capable of performing closed caption (CC) rendering, for determining whether the AV source is performing CC rendering properly, the processing system comprising:
a set of one or more processors; and
a non-transitory machine-readable storage medium containing code, which when executed by the set of one or more processors, causes the processing system to:
receive a set of one or more reference AV streams from the AV source,
generate reference CC images from the set of one or more reference AV streams starting from a recording start time to a recording stop time, wherein each one of the reference CC images is displayed on a screen and is associated with reference metadata, and wherein the reference metadata of a reference CC image include reference position in a reference video frame of the set of one or more reference AV streams, and a reference frame count indicating a number of reference video frames of the set of one or more reference AV streams in which the reference CC image is present,
receive a set of one or more test AV streams from the AV source,
generate test CC images from the set of one or more test AV streams starting from the recording start time to the recording stop time, wherein each one of the test CC images is associated with test metadata, wherein the test metadata of a test CC image include has a test position in a test video frame of the set of one or more test AV streams, and a test frame count indicating a number of test video frames of the set of one or more test AV streams in which the test CC image is present, and
determine whether the AV source is performing CC rendering properly by automatically comparing the test CC images against the reference CC images, and wherein automatically comparing the test CC images against the reference CC images includes determining whether a difference between a test frame count of a test CC image and a reference frame count of a corresponding reference CC image exceeds a frame count mismatch tolerance.

12. The processing system of claim 11, wherein the non-transitory machine-readable storage medium further contains code, which when executed by the set of one or more processors, causes the processing system to:
determine that the AV source has a new software upgrade; and
in response to determining that the AV source has the new software upgrade, automatically communicate with the AV source to cause the AV source to send the set of one or more test AV streams.

13. The processing system of claim 11, wherein the non-transitory machine-readable storage medium further contains code, which when executed by the set of one or more processors, causes the processing system to:
Generate the reference metadata from the set of one or more reference AV streams; and
generate the test metadata from the set of one or more test AV streams.

14. The processing system of claim 11, automatically comparing the test CC images against the reference CC images further includes determining whether a difference between a position of a test CC image and a position of a corresponding reference CC image exceeds a position mismatch tolerance.

15. The processing system of claim 14, wherein the position mismatch tolerance is configurable.

16. The processing system of claim 11, wherein the frame count mismatch tolerance is configurable.

17. The processing system of claim 13, wherein the reference metadata includes a reference time point indicating a time relative to the recording start time at which a reference CC image appears on a reference video frame of the set of one or more reference AV streams, wherein the test metadata includes a test time point indicating a time relative to the recording start time at which a test CC image appears on a test video frame of the set of one or more test AV streams.

18. The processing system of claim 17, wherein automatically comparing the test CC images against the reference CC images further includes determining whether a difference between a time point of a test CC image and a time point of a corresponding reference CC image exceeds a time point mismatch tolerance, wherein the time point mismatch tolerance is configurable.

19. The processing system of claim 11, wherein automatically comparing the test CC images against the reference CC images comprises the processing system to determine whether a number of mismatched pixels between a test CC image and a corresponding reference CC image exceeds a pixel mismatch tolerance, wherein the pixel mismatch tolerance is configurable.

20. The processing system of claim 19, wherein the non-transitory machine-readable storage medium further contains code, which when executed by the set of one or more processors, causes the processing system to generate an image result comprising of a reference CC image, a test CC image, and a superimposed CC image comprising of the reference CC image and the test CC image superimposed on each other.

21. A non-transitory machine-readable storage medium having computer code stored therein, which when executed by a set of one or more processors of a processing system that is communicatively coupled to an audio video (AV) source capable of performing closed caption (CC) rendering, for determining whether the AV source is performing CC rendering properly, causes the processing system to perform operations comprising:
receiving a set of one or more reference AV streams from the AV source;
generating reference CC images from the set of one or more reference AV streams starting from a recording start time to a recording stop time, wherein each one of the reference CC images is displayed on a screen and is associated with reference metadata, and wherein the reference metadata of a reference CC image include a reference position in a reference video frame of the set of one or more reference AV streams, and a reference frame count indicating a number of reference video frames of the set of one or more reference AV streams in which the reference CC image is present;
receiving a set of one or more test AV streams from the AV source;
generating test CC images from the set of one or more test AV streams starting from the recording start time to the recording stop time, wherein each one of the test CC images is associated with test metadata, wherein the test metadata of a test CC image include has a test position in a test video frame of the set of one or more test AV streams, and a test frame count indicating a number of test video frames of the set of one or more test AV streams in which the test CC image is present; and
determining whether the AV source is performing CC rendering properly by automatically comparing the test CC images against the reference CC images, and wherein automatically comparing the test CC images against the reference CC images includes determining whether a difference between a frame count of a test CC image and a frame count of a corresponding reference CC image exceeds a frame count mismatch tolerance.

22. The non-transitory machine-readable storage medium of claim 21, wherein the operations further comprise:
determining that the AV source has a new software upgrade; and
in response to determining that the AV source has the new software upgrade, automatically communicating with the AV source to cause the AV source to send the set of one or more test AV streams.

23. The non-transitory machine-readable storage medium of claim 21, wherein the operations further comprise:
generating the reference metadata from the set of one or more reference AV streams; and
generating the test metadata from the set of one or more test AV streams.

24. The non-transitory machine-readable storage medium of claim 21, wherein automatically comparing the test CC images against the reference CC images further includes determining whether a difference between a position of a test CC image and a position of a corresponding reference CC image exceeds a position mismatch tolerance.

25. The non-transitory machine-readable storage medium of claim 24, wherein the position mismatch tolerance is configurable.

26. The non-transitory machine-readable storage medium of claim 21 wherein the frame count mismatch tolerance is configurable.

27. The non-transitory machine-readable storage medium of claim 23, wherein the reference metadata includes a reference time point indicating a time relative to the recording start time at which a reference CC image appears on a reference video frame of the set of one or more reference AV streams, wherein the test metadata includes a test time point indicating a time relative to the recording start time at which a test CC image appears on a test video frame of the set of one or more test AV streams.

28. The non-transitory machine-readable storage medium of claim 27, automatically comparing the test CC images against the reference CC images further includes determining whether a difference between a time point of a test CC image and a time point of a corresponding reference CC image exceeds a time point mismatch tolerance, wherein the time point mismatch tolerance is configurable.

29. The non-transitory machine-readable storage medium of claim 21, wherein automatically comparing the test CC images against the reference CC images comprises determining whether a number of mismatched pixels between a test CC image and a corresponding reference CC image exceeds a pixel mismatch tolerance, wherein the pixel mismatch tolerance is configurable.

30. The non-transitory machine-readable storage medium of claim 29, wherein the operations further comprise generating an image result comprising of a reference CC image, a test CC image, and a superimposed CC image comprising of the reference CC image and the test CC image superimposed on each other.

* * * * *